United States Patent
Wang

(10) Patent No.: US 10,532,760 B1
(45) Date of Patent: Jan. 14, 2020

(54) SYSTEMS AND METHODS FOR AN ADJUSTABLE STEERING WHEEL

(71) Applicant: Honda Motor Co., Ltd., Tokyo (JP)

(72) Inventor: Andrew Wang, San Francisco, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/458,835

(22) Filed: Jul. 1, 2019

(51) Int. Cl.
*B62D 1/04* (2006.01)
*B62D 1/08* (2006.01)
*B62D 1/06* (2006.01)

(52) U.S. Cl.
CPC ....... *B62D 1/08* (2013.01); *B62D 1/06* (2013.01)

(58) Field of Classification Search
CPC ............... B62D 1/04; B62D 1/06; B62D 1/08
See application file for complete search history.

(56) References Cited

U.S. PATENT DOCUMENTS

| | | | | |
|---|---|---|---|---|
| 1,142,307 A | * | 6/1915 | Cleve | B62D 1/04 74/552 |
| 2,210,232 A | * | 8/1940 | Crockett | B62D 1/08 74/552 |
| 2,298,596 A | * | 10/1942 | Schrantz | B62D 1/06 74/558 |
| 2,954,708 A | * | 10/1960 | Huzzard | B62D 1/04 74/552 |
| 7,610,830 B2 | | 11/2009 | Gil | |
| 9,896,119 B2 | * | 2/2018 | Lin | B62D 1/06 |
| 2011/0226088 A1 | * | 9/2011 | Muller | B62D 1/08 74/552 |
| 2019/0118851 A1 | * | 4/2019 | Schmidt | B62D 1/08 |

FOREIGN PATENT DOCUMENTS

| | | | |
|---|---|---|---|
| CN | 2934006 | | 8/2007 |
| CN | 105786084 | | 7/2016 |
| CN | 208498581 | | 2/2019 |
| DE | 2013795 | A1 * 10/1971 | ............... B62D 1/08 |
| DE | 10316350 | | 10/2004 |
| DE | 102006006995 | | 8/2007 |
| DE | 102008045918 | | 5/2009 |
| DE | 102016002204 | | 8/2017 |

(Continued)

OTHER PUBLICATIONS

Yvkoff, Liane; Next-generation steering wheel folds entirely away; Road Show by CNET; Jun. 30, 2011; pp. 1-3.

*Primary Examiner* — Adam D Rogers
(74) *Attorney, Agent, or Firm* — Rankin, Hill & Clark LLP

(57) ABSTRACT

Systems and methods described herein are directed to an adjustable steering wheel. According to one aspect, a steering wheel includes a center post, a plurality of arc segments, a plurality of telescoping arms, and a plurality of modular segments. The plurality of arc segments have a fixed arc length relative to a center post axis defined by the center post. Each arm of the plurality of telescoping arms has a first end portion affixed to the center post and a second end portion non-removably affixed to an arc segment of the plurality of arc segments. The plurality of modular segments have adjustable arc lengths relative to the center post axis. Together the plurality of arc segments and the plurality of modular segments cooperate to define a circumference of the steering wheel that is orthogonal to the center post axis.

16 Claims, 5 Drawing Sheets

(56) References Cited

FOREIGN PATENT DOCUMENTS

| | | | | | |
|---|---|---|---|---|---|
| GB | 628857 | A * | 9/1949 | ............. | B60T 13/72 |
| JP | 2018108746 | | 7/2018 | | |
| KR | 19980038261 | | 9/1998 | | |
| KR | 100527755 | | 11/2005 | | |
| KR | 101271806 | | 6/2013 | | |

* cited by examiner

SYSTEMS AND METHODS FOR AN ADJUSTABLE STEERING WHEEL

BACKGROUND

A steering wheel is a part of a steering system of a vehicle that is manipulated by the vehicle occupant to maneuver the vehicle. For example, the steering wheel may be manipulated through direct mechanical contact, with or without the assistance of hydraulic power steering (HPS), or as in some modern production cars, with the assistance of Electric Power Steering. The steering wheel is the primary contact point between a vehicle occupant and a vehicle. However, despite the numerous shapes and sizes of vehicle occupants and vehicles, steering wheels are generally the same size and shape. While the position of the steering wheel may be changed, for example tilted, the size and shape are typically fixed such that the vehicle occupant is unable to customize the size and shape of the steering wheel despite the vehicle occupant being in routine contact with the steering wheel.

BRIEF DESCRIPTION

According to one aspect, a steering wheel includes a center post, a plurality of arc segments, a plurality of telescoping arms, and a plurality of modular segments. The plurality of arc segments have a fixed arc length relative to a center post axis defined by the center post. Each arm of the plurality of telescoping arms has a first end portion affixed to the center post and a second end portion non-removably affixed to an arc segment of the plurality of arc segments. The plurality of modular segments have adjustable arc lengths relative to the center post axis. Together the plurality of arc segments and the plurality of modular segments cooperate to define a circumference of the steering wheel that is orthogonal to the center post axis.

According to another aspect, a steering wheel includes a center post, a plurality of arc segments, a plurality of telescoping arms, and a plurality of modular segments. The plurality of arc segments have a fixed arc length relative to a center post axis defined by the center post. Each arm of the plurality of telescoping arms has a first end portion affixed to the center post and a second end portion non-removably affixed to an arc segment of the plurality of arc segments. The plurality of modular segments have adjustable arc lengths relative to the center post axis. Together the plurality of arc segments and the plurality of modular segments cooperate to define a circumference of the steering wheel that defines a retracted state and an expanded state. In the retracted state, the plurality of modular segments are retracted so as to define a minimum circumference. In the expanded state, the plurality of modular segments are expanded so as to define a maximum circumference.

According to yet a further aspect, a method of adjusting a circumference of a steering wheel including a plurality of modular segments, a plurality of arc segments, and a plurality of telescoping arms that are retractably affixed to a center post, the center post having a center post axis. The method includes receiving a radial force relative to the center post axis at one or more of the modular segments of the plurality of modular segments. The radial force has a force direction including an inward direction toward the center post axis or an outward direction away from the center post axis. The plurality of modular segments have an adjustable arc length relative to the center post axis. The plurality of arc segments and the plurality of modular segments cooperate to define a circumference of the steering wheel that is orthogonal to the center post axis. The method further continues cooperatively adjusting the plurality of telescoping arms corresponding to the radial force. Each arm of the plurality of telescoping arms has a first end portion affixed to the center post and a second end portion non-removably affixed to an arc segment of the plurality of arc segments that separate a first set of the modular segments of the plurality of modular segments from a second set of the modular segments of the plurality of modular segments.

DETAILED DESCRIPTION

Figure 1:
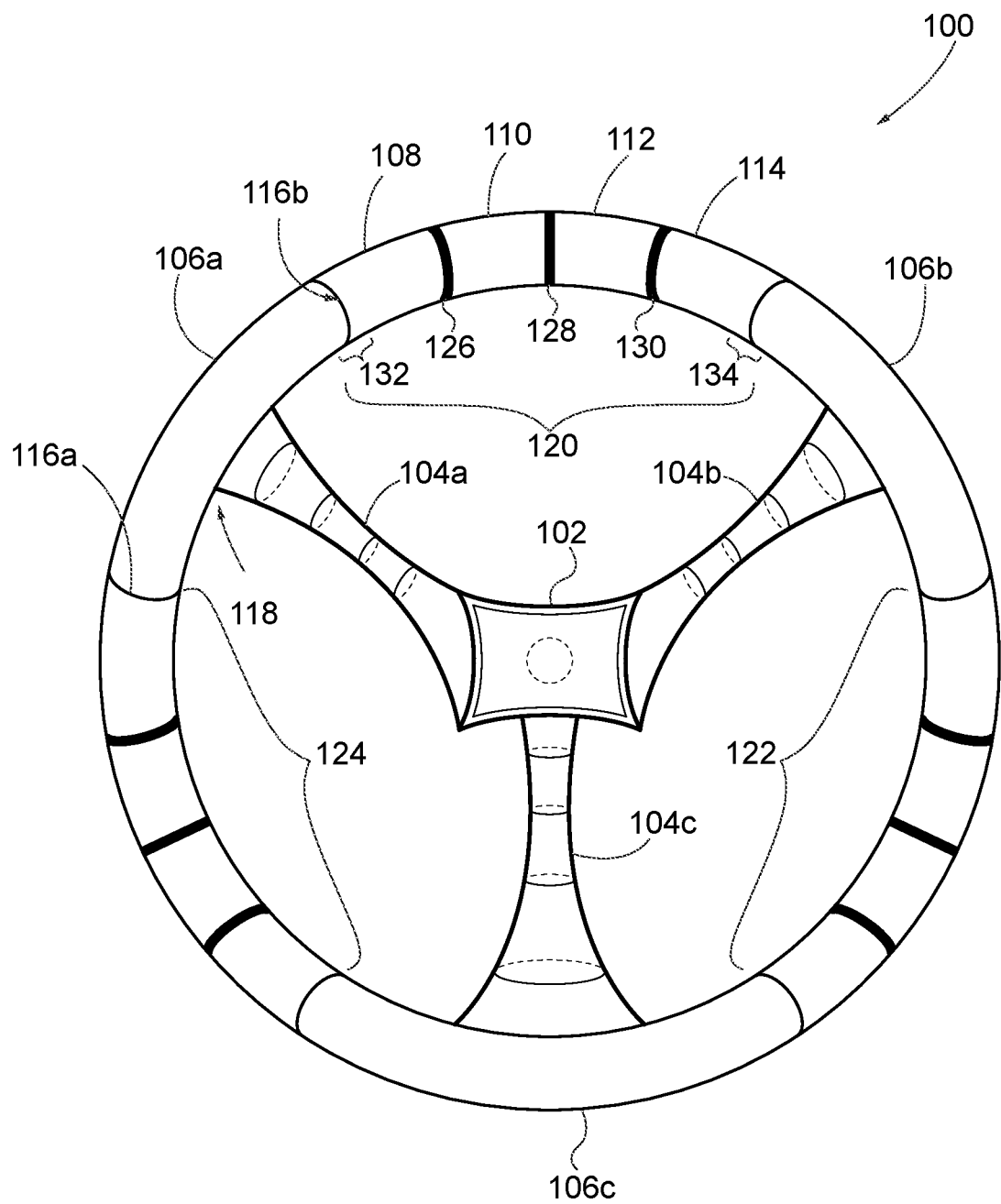
FIG. 1 is a frontal view of an adjustable steering wheel according to an exemplary embodiment.

The embodiments described herein are provided to allow the size and shape of the steering wheel to be adjusted by a vehicle occupant. In particular, the steering wheel includes arc segments that give the steering wheel form and modular segments allow the shape and size of the steering wheel to be adjusted. For example, when a radial force is applied to one or more of the modular segments, the modular segments may expand or contract such that the circumference of the steering wheel correspondingly increases or decreases. Specifically, when a vehicle occupant applies a radial force toward the center post axis, the modular segments, individually or collectively, contract to reduce the overall circumference of the steering wheel. Likewise, when the vehicle occupant applies a radial force outward from the center post axis, the modular segments, individually or collectively, expand to increase the overall circumference of the steering wheel. The adjustment of the modular segments may also change the shape of the steering wheel depending on where and how the radial force is applied to the steering wheel. Accordingly, the vehicle occupant is able to customize the size and shape of the steering wheel.

The adjustable steering wheel may be supported by a plurality of telescoping arms and/or tension joints situated between the modular segments. For example, the telescoping arms may cooperate to retract within the center post to reduce the circumference of the steering wheel and emerge from the center post to increase the circumference of the steering wheel. In this manner, the telescoping arms support and maintain the selected circumference of the steering wheel. Additionally or alternatively, a tension joint may be used to limit travel of adjacent modular segments to a radial direction. Thus, once the vehicle occupant applies the radial force to the steering wheel to adjust the size and/or shape, the steering wheel can be locked into place.

Definitions

The following includes definitions of selected terms employed herein. The definitions include various examples and/or forms of components that fall within the scope of a term and that can be used for implementation. The examples are not intended to be limiting.

"Value" and "level", as used herein can include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

"Vehicle," as used herein, refers to any moving vehicle that is capable of carrying one or more users, is powered by any form of energy, and has a steering wheel. The term "vehicle" includes, but is not limited to, cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with predetermined paths or free-moving vehicles.

A "vehicle occupant," as used herein can include, but is not limited to, one or more biological beings located in the vehicle. The vehicle occupant can be a driver or a passenger of the vehicle. The vehicle occupant can be a human (e.g., an adult, a child, an infant).

Hereinafter, an embodiment of the present invention is described with reference to the attached figures. In the present application, an x direction refers to a direction along a central axis of a steering wheel. In other words, the x direction corresponds to an axial direction of a steering column. A rear direction of the vehicle is set to be the "+x" direction. The left-right direction of the vehicle is set to be the y direction. The z direction is a direction perpendicular to the x-y direction. An upper direction of the vehicle is set to be the "+z" direction. In addition, a frontal side refers to a side of a vehicle occupant operating the steering wheel. A back side is set to be the side opposite to the frontal side. Furthermore, in the following description, a radial direction refers to the radial direction of the steering wheel in the y-z plane.

Referring now to the drawings, the showings are for purposes of illustrating one or more exemplary embodiments and not for purposes of limiting the same. FIG. 1 is a frontal view of the steering wheel 100 having a center portion and circumferential portion. The center portion of the steering wheel 100 includes a center post 102 and a plurality of telescoping arms including telescoping arms 104a, 104b, and 104c. In some embodiments, the center post 102 may be covered rotatably supported from the back side by a steering column (not shown). Additionally or alternatively, a horn pad (not shown) may be placed at a frontal face of the center post 102 and include, for example an air bag, for instance, stored inside the horn pad. Various switches and or paddles for control of a vehicle may also be provided on the steering wheel 100. Incidentally, an electrical unit, which controls these various vehicle switches and/or paddles may also be provided on the steering wheel 100.

The telescoping arms may include a first telescoping arm 104a, a second telescoping arm 104b, and a third telescoping arm 104c. The telescoping arms 104a, 104b, and 104c are affixed the center post 102 at a first end of the telescoping arms 104a, 104b, and 104c. The center post 102 defines a longitudinal center post axis substantially orthogonal to the circumferential portion of the steering wheel 100 in the x direction. The telescoping arms 104a, 104b, and 104c extend from the center post 102 in the y-z plane. While three telescoping arms 104a, 104b, and 104c are shown, various configurations of the telescoping arms may be used. For example, more or fewer telescoping arms may be used. Likewise, the telescoping arms 104a, 104b, and 104c may be arranged at different angles relative to one another in the y-z plane.

The circumferential portion of the steering wheel 100 defines the circumferences of the steering wheel 100 and includes a plurality of arc segments, including a first arc segment 106a, a second arc segment 106b, and third arc segment 106c and a plurality of modular segments, including modular segments 108-114. The arc segments 106a, 106b, and 106c may be non-removably affixed to the corresponding telescoping arms 104a, 104b, and 104c at a second end portion of the telescoping arms 104a, 104b, and 104c. The telescoping arms 104a, 104b, and 104c may be affixed to the arc segments 106a, 106b, and 106c at a point equidistant from a first radial end of an arc segment and a second radial end of an arc segment. For example, the first telescoping arm 104a may be generally affixed to the first arc segment 106a equidistant from a first radial end 116a of the first arc segment 106a and a second radial end 116b of the first arc segment 106a at a center point 118 of the first arc segment 106a. In another embodiment, telescoping arms 104a, 104b, and 104c may be affixed to the arc segments 106a, 106b, and 106c at a point at or approaching a radial end. For example, the first telescoping arm 104a may be generally affixed to the first arc segment 106a at the first radial end 116a.

In some embodiments, the telescoping arms 104a, 104b, and 104c may be non-removably affixed to the corresponding arc segments 106a, 106b, and 106c such that the telescoping arms 104a, 104b, and 104c and the corresponding arc segments 106a, 106b, and 106c are integrally formed. For example, the first telescoping arm 104a may be integrally formed with the first arc segment 106a. Accordingly, the number of arc segments 106a, 106b, and 106c may correspond to the number of the telescoping arms 104a, 104b, and 104c in a one to one ratio.

The center post 102, the telescoping arms 104a, 104b, and 104c and the arc segments 106a, 106b, and 106c may be constructed from one more materials. The one or more materials may include aluminum, magnesium, steel, resin, polymers, composites, foams, and/or polyurethane. In one embodiment, the center post 102, the telescoping arms 104a, 104b, and 104c, and the corresponding arc segments 106a, 106*b*, and 106*c* may be integrally formed by a primary material surrounded by a secondary material, such as the primary material as a core metal surrounded by the secondary material that is a polymer.

The arc segments 106*a*, 106*b*, and 106*c* have a fixed arc length in the circumferential direction relative to the center post axis. A circumferential direction refers to the circumferential direction of the steering wheel 100. Accordingly, regardless of the circumference of the steering wheel 100, the arc length of the arc segments 106*a*, 106*b*, and 106*c* may be fixed. However, the arc length of the arc segments 106*a*, 106*b*, and 106*c* may not be equal. For example, the first arc segment 106*a* may have a fixed arc length that is longer than the fixed arc length of the second arc segment 106*b*. Varying arc lengths may be based on a predetermined radius extending from the arc segments 106*a*, 106*b*, and 106*c* to the center post 102.

The plurality modular segments may include modular segments of a number of modular sections such as a first modular section 120, a second modular section 122, and a third modular section 124. For example, the first modular section 120 may include the modular segments 108-114. The number of modular sections may correspond to the number of the telescoping arms 104*a*, 104*b*, and 104*c* or the arc segments 106*a*, 106*b*, and 106*c* in a one to one ratio. The number of modular segments in the modular section 120-124 may be equal or vary from section to section. For example, the first modular section 120 may have four modular segments while the second modular section 122 may have six modular segments, while the third modular section 124 may have the same or different number of modular segments as another section.

Figure 2:
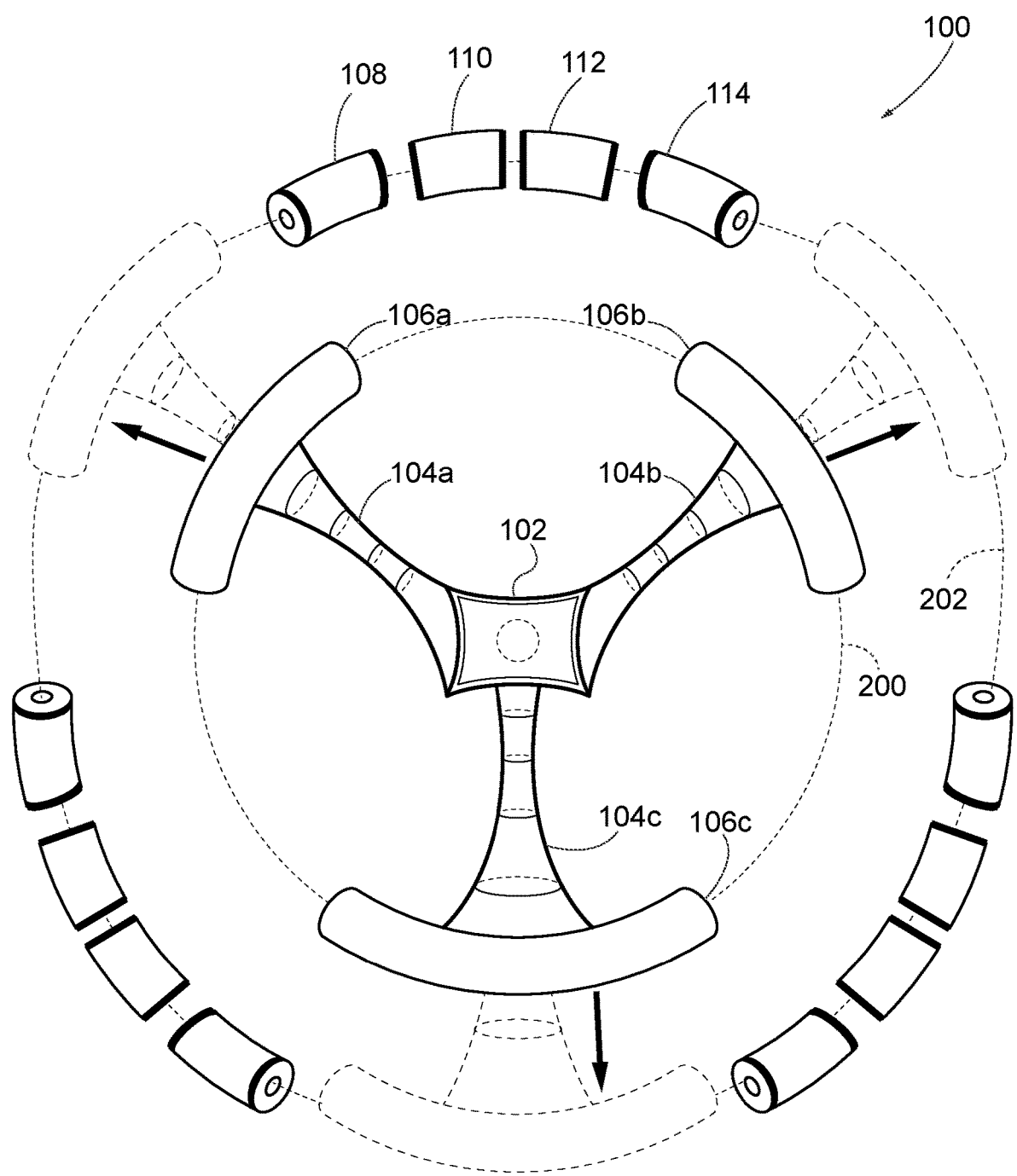
FIG. 2 is an exploded frontal view of an adjustable steering wheel according to an exemplary embodiment.

The plurality of modular segments have an adjustable arc length relative to the center post axis. In some embodiments, the modular segments, such as modular segments 108-114, are individual segments that are removably attached to one another at tension joints, such as the tension joints 126, 128, 130. Turning to FIG. 2, an exploded view of the steering wheel 100 is shown in an embodiment in which the tension joints, such as the tension joints 126, 128, 130, and the detachable joints, including the first detachable joint 132 and the second detachable joint 134, are released. The joints may be released in response to a force being exerted on the steering wheel 100. For example, the tension joints 126-130 may release in response to a first threshold amount of force being applied to the modular segments of the steering wheel 100 in a radial direction relative to the center post axis. In another embodiment, the tension joints may be locking hinged cylinder joints that lock adjacent modular segments in place when a radial force eases.

The detachable joints 132 and 134 may release in response to a second threshold amount of force being applied to the modular segments of the steering wheel 100 in an orthogonal direction relative to the center post axis. When a radial force, less than the first threshold, is applied to the modular segments of the steering wheel 100, the shape and/or size, including the circumference, of the steering wheel 100 may be adjusted. The first threshold and the second threshold may be set sufficiently high such that the tension joints 126, 128, 130 and the detachable joints 132 and 134 lock the steering wheel. Additionally or alternatively, a separate locking mechanism, such as a pin, an anchor, and/or other stabilizing feature may be set so as to prevent adjustment of the circumference of the steering wheel in response to receiving the radial force.

In another embodiment, the modular segments 108-114 and the tension joints 126-130 may form a single aggregate segment that is removably attached to the arc segment 106*a* at a first detachable joint 132 and the arc segment 106*b* at a second detachable joint 134. Accordingly, the modular segments may be removably attached to one another as well as the arc segments 106*a*, 106*b*, and 106*c* or be removable in the modular sections. The arc segments 106*a*, 106*b*, and 106*c* and the plurality of modular segments, including the modular segments 108-114, cooperate to define a circumference of the steering wheel 100 that is generally orthogonal to the center post axis.

Figure 3A:
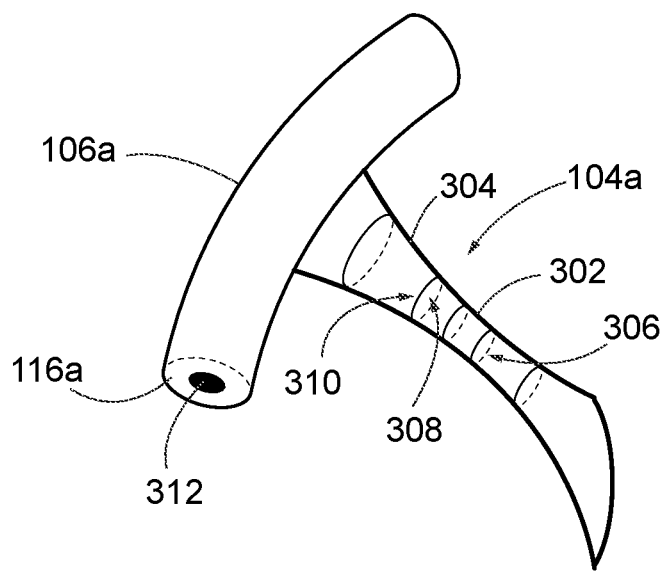
FIG. 3A is a side view of a telescoping arm, of an adjustable steering wheel, in a shortened state according to an exemplary embodiment.
Figure 3B:
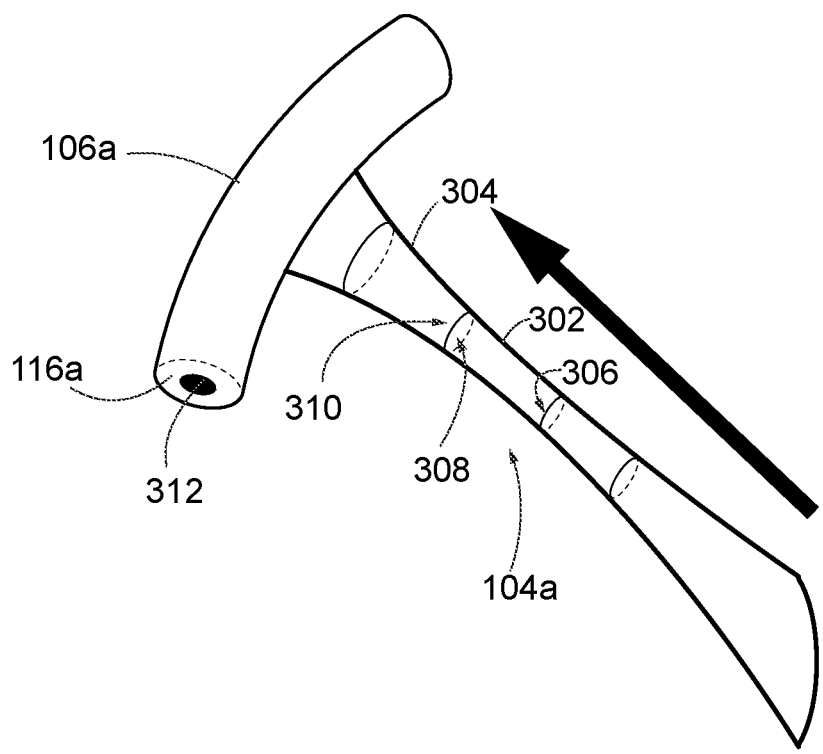
FIG. 3B is a side view of a telescoping arm, of an adjustable steering wheel, in a shortened state according to an exemplary embodiment.

FIG. 3A is a side view of the first telescoping arm 104*a* and the first arc segment 106*a* of the steering wheel 100 in a shortened state according to an exemplary embodiment. The telescoping arms 104*a*, 104*b*, and 104*c* have a variable length. For example, as shown, the first telescoping arm 104*a*, may be configured to have a telescoping action to vary the radial length of the first telescoping arm 104*a*. Accordingly, the telescoping arms can be extended to a lengthened state. FIG. 3B is a side view of the first telescoping arm 104*a* and the first arc segment 106*a* of the steering wheel 100 in the lengthened state according to an exemplary embodiment. The telescoping arms being in a shortened state may correspond to minimum circumference 200 of the steering wheel, shown in FIG. 2. Alternatively, the telescoping arms being in a lengthened state may correspond to maximum circumference 202 of the steering wheel, also shown in FIG. 2.

Returning to FIG. 3A, an example of the telescoping action is discussed with respect to a single telescoping joint for clarity, but more or fewer may be used. The first telescoping arm 104*a* includes an inner arm 302 and an outer arm 304. The inner arm 302 has a first inner arm end 306 adjacent the center post 102 and a second inner arm end 308 opposing the first inner arm end 306 and adjacent the first arc segment 106*a*. The outer arm 304 is configured to receive the inner arm 302 at a receiving end 310. For example, the inner arm 302 and the outer arm 304 may have corresponding shapes such that a second inner arm end 308 slidably connects with the receiving end 310. Suppose that the inner arm 302 and the outer arm 304 are tubular shaped. The tubular-shaped outer arm 304 is pushed along along the inner arm 302 in response to the circumference of the steering wheel being adjusted due to a radial force. For example, the tubular-shaped outer arm 304 may increasingly overlap the inner arm 302 in response to a decreasing circumference of the steering wheel 100 or the tubular-shaped outer arm 304 may decreasingly overlap the inner arm 302 in response to an increasing circumference of the steering wheel 100.

As discussed above, the first radial end 116*a* of the first arc segment 106*a* may be configured to be removably attached to a modular segment at a detachable joint. The detachable joint may be a magnetic joint. An arc segment magnet 312 comprised of a magnetic material may be non-removably affixed to the first radial end 116*a* of the first arc segment 106*a*. In another embodiment, the arc segment magnet 312 may be disposed coaxially with the first radial end 116*a*. The arc segment magnet 312 may be formed by the directly into the first radial end 116*a* or be affixed to the first radial end 116*a* by heat welding, gluing, and/or other suitable connection.

Figure 4A:
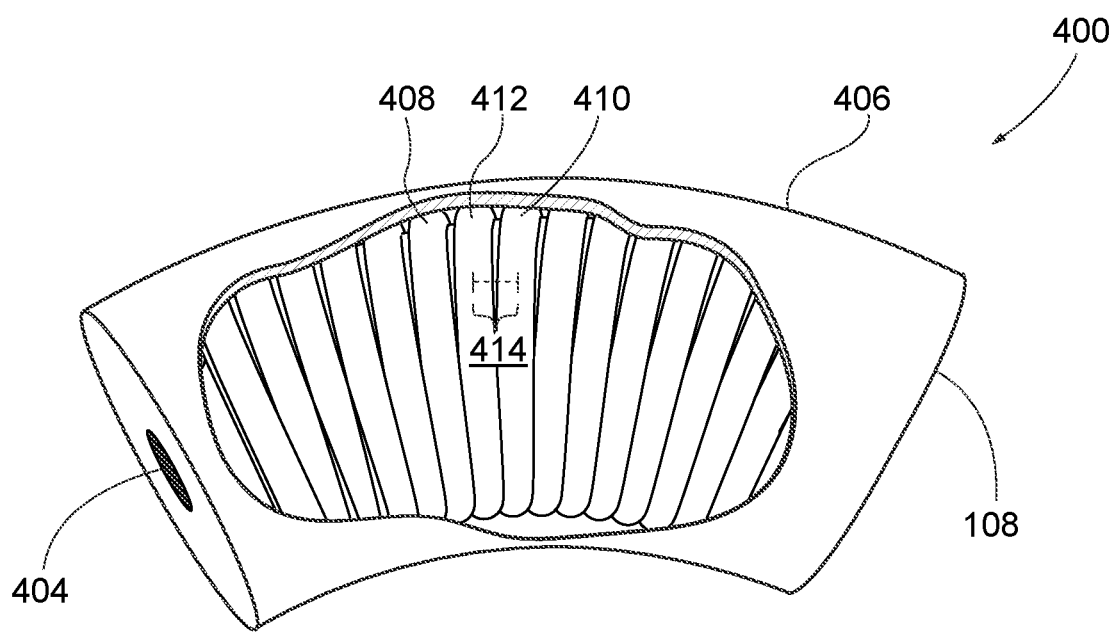
FIG. 4A is a cutaway view of the example modular segment as a retracted modular segment according to an exemplary embodiment.

Turning to FIG. 4A, when the arc segment magnet 312 and a modular segment magnet 404, also comprised of a magnetic material, are engaged (i.e., at least partially connected by virtue of magnetic force) the magnetic connection between the arc segment magnet 312 and the modular segment magnet 404 can provide sufficient suction to ensure the modular segment 108 is removably connected to the first arc segment 106a at the first radial end 116a. Accordingly, the detachable joint is formed by cooperation of a first magnetic material of the first modular segment and a second magnetic material of the arc segment. In some embodiments, when the modular segment magnet 404 receives the arc segment magnet 312, the modular segment 108 may be rotatable or disengaged in response to a first threshold amount of force being applied to the steering wheel 100 in a radial direction relative to the center post axis.

Figure 4B:
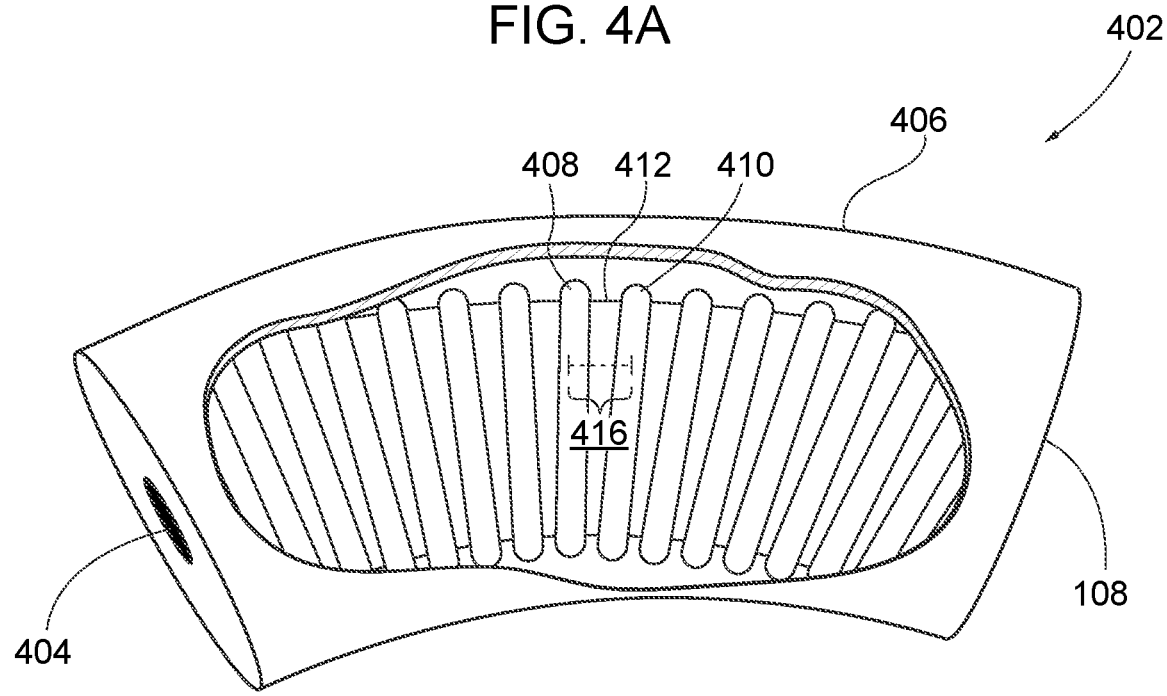
FIG. 4B is a cutaway view of the example modular segment as an expanded modular segment according to an exemplary embodiment.

FIGS. 4A and 4B are cutaway diagrams of the modular segment 108. In particular, FIG. 4A is a cutaway view of the modular segment 108, as one example, in a retracted state 400 according to an exemplary embodiment. FIG. 4B is a cutaway view of the modular segment 108 in an expanded state 402 according to an exemplary embodiment.

In some embodiments, the modular segment 108 may have an outer wrap 406 that coaxially surrounds the modular segment 108 forming a flexible outer body that at least partially covers the collapsible inner body. In addition to covering the modular segment 108, the outer wrap 406 may cover the center post 102, telescoping arms 104a, 104b, and 104, and/or the arc segments 106a, 106b, and 106c. The outer wrap 406 may be comprised of materials such as natural leather, artificial leather, foam, fabric, polymer, and/or polyurethane.

Suppose that the modular segment 108 is in a retracted state 400 due to the internal structure of the modular segment. The internal structure may be a ribbed, accordion, corrugated structure, collapsing framework, or other structure that allows for expansion and contraction. Suppose that the modular segment 108 has a ribbed structure. For example, a first rib 408 and a second rib 410 separated by a collar 412. The ribs 408 and 410 and the collar 412 may be collapsible such that the distance from a longitudinal center of the first rib 408 to a longitudinal center of the second rib 410 is a shortened rib length 414 in the retracted state 400. The ribs 408 and 410 and the collar 412 may also be expandable such that the distance from a longitudinal center of the first rib 408 to a longitudinal center of the second rib 410 is a lengthened rib length 416 in the expanded state 402.

Figure 5:
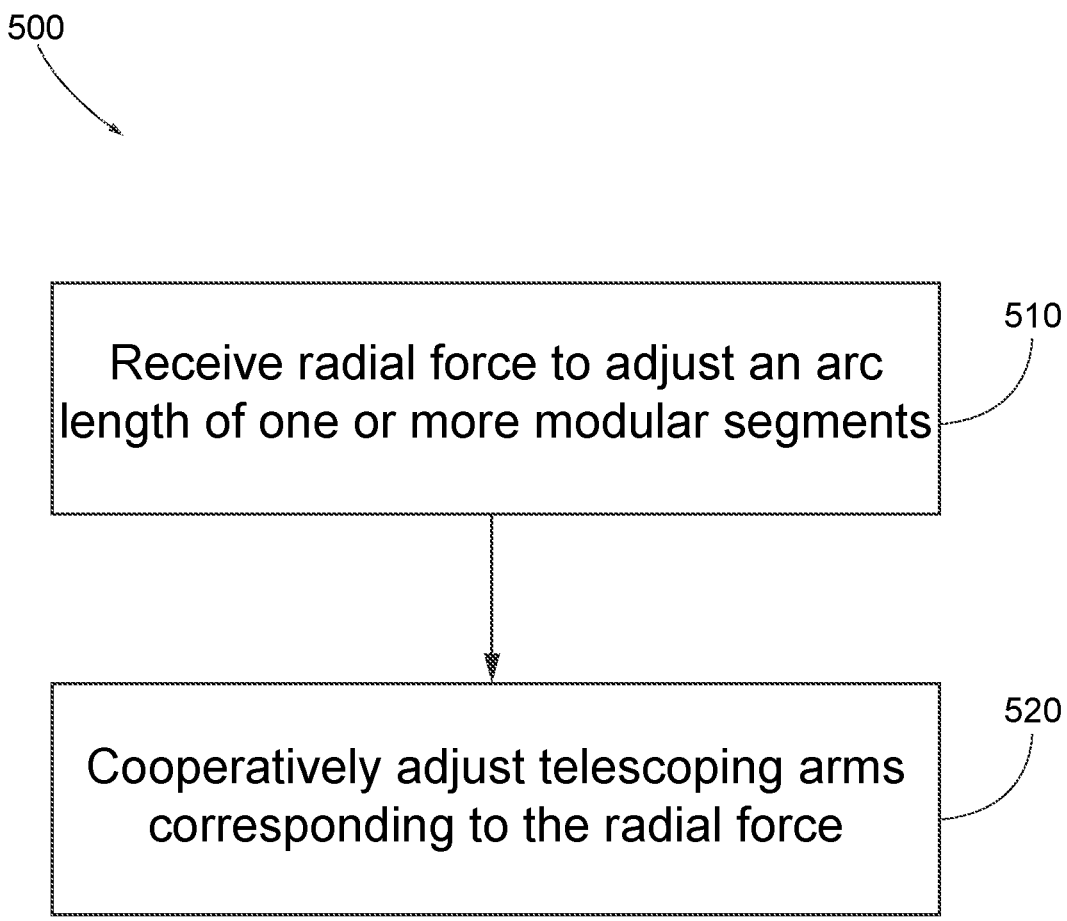
FIG. 5 is a process flow diagram of a method adjusting an adjustable steering wheel according to an exemplary embodiment.

FIG. 5 is a process flow diagram of a method 500 for adjusting an adjustable steering wheel according to an exemplary embodiment. It is understood that the illustrative examples discussed herein are exemplary in nature and that varying forms of radial force, adjustable steering wheels including center post 102, telescoping arms 104a, 104b, and 104c, arc segments 106a, 106b, and 106c, and modular segments, such as 108-114 can be implemented.

At step 510, the method 500 includes receiving a radial force at the steering wheel 100. The radial force may be exerted by a vehicle occupant. The radial force is exerted in the y-z axis plane toward or away from the center post axis. As discussed above, the circumferential plane corresponds to the circumference of the steering wheel 100 collectively formed by arc segments 106a, 106b, and 106c, and modular segments, such as 108-114.

The radial force may be exerted to cause the movement of an individual modular segment, a modular section, or the steering wheel 100. Accordingly, the radial force may cause a non-uniform change in the circumference of the steering wheel. For example, a radial force at least applied to the modular segment 108 may cause only the radial circumference of the modular segment 108 or the first modular section 120 to be different than the remainder of the steering wheel 100. Alternatively, the radial circumference of the steering wheel 100 may be altered in response to the radial force being exerted at the modular segment 108.

Receiving the radial force results in adjusting the arc length of one or more modular segments corresponding to the direction of the radial force. In particular, the radial force may cause one or more of the modular segments to collapse, thereby decreasing the arc length of the modular segment corresponding to the shortened rib length 414. The radial force in the opposite action may cause one or more of the modular segments to expand, thereby increasing the arc length of the modular segment corresponding to the lengthened rib length 416.

The steering wheel 100 defines a retracted state in which the plurality of modular segments are retracted so as to define a minimum circumference 200. Likewise, the steering wheel 100 defines an expanded state in which the plurality of modular segments are expanded so as to define a maximum circumference 202. There may be one or more intermediary states between the retracted state and the expanded state. For example, the steering wheel 100 may define at least one intermediary state in which the plurality of modular segments are oriented such that the steering wheel 100 has a circumference that is less than the maximum circumference and that is greater than the minimum circumference.

At step 520, the method 500 includes cooperatively adjusting the telescoping arms 104a, 104b, and 104c corresponding to the radial force. In one embodiment, as the radial force causes a change in circumference of the steering wheel 100, the telescoping arms 104a, 104b, and 104c may shorten or lengthen to accommodate the changing circumference. For example, as the circumference of the steering wheel 100 increases according to an outward radial force, the telescoping arms 104a, 104b, and 104c may lengthen. Conversely, as the circumference of the steering wheel 100 decreases according to an inward radial force, the telescoping arms 104a, 104b, and 104c may shorten. In another embodiment, the shortening of the telescoping arms 104a, 104b, and 104c may be caused by the telescoping arms 104a, 104b, and 104c being retracted into the center post 102, whereas the lengthening of the telescoping arms 104a, 104b, and 104c may be cause by the telescoping arms 104a, 104b, and 104c emerging from the center post 102.

In this manner described, a vehicle occupant can customize the size and shape of the steering wheel 100. However, the steering wheel can be manufactured on a large-scale because the customization is based on the telescoping arms 104a, 104b, and 104, and/or the arc segments 106a, 106b, and 106c, and the modular segments. Furthermore, because the modular segments are releasably connected to one another and the arc segments 106a, 106b, and 106c, the steering wheel 100 may break apart in the event that the vehicle experiences a force that exceeds the first threshold and/or the second threshold.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:
1. A steering wheel, comprising
   a center post,
   a plurality of arc segments having a fixed arc length relative to a center post axis defined by the center post;
   a plurality of telescoping arms, each arm of the plurality of telescoping arms having a first end portion affixed to the center post and a second end portion non-removably affixed to an arc segment of the plurality of arc segments; and
a plurality of modular segments having an adjustable arc length relative to the center post axis, wherein the plurality of arc segments and the plurality of modular segments cooperate to define a circumference of the steering wheel that is orthogonal to the center post axis.

2. The steering wheel of claim 1, wherein the plurality of modular segments includes a first modular segment and a second modular segment that is adjacent to the first modular segment, and wherein the first modular segment is releasably connected to the second modular segment at a tension joint.

3. The steering wheel of claim 2, wherein the tension joint is configured to release the first modular segment from the second modular segment in response to a threshold amount of force being applied to the steering wheel in an orthogonal direction relative to the center post axis.

4. The steering wheel of claim 2, wherein the tension joint is a locking hinged cylinder joint that limits travel of the first modular segment and the second modular segment so as to allow the first modular segment end the second modular segment move radially with respect to the center post axis.

5. The steering wheel of claim 1, wherein a first modular segment of the plurality of modular segments is releasably connected to the arc segment of the plurality of arc segments adjacent to the first modular segment at a detachable joint.

6. The steering wheel of claim 5, wherein the detachable joint is formed by cooperation of a first magnetic material of the first modular segment and a second magnetic material of the arc segment.

7. The steering wheel of claim 1, wherein the steering wheel defines a retracted state in which the plurality of modular segments are retracted so as to define a minimum circumference, and wherein the steering wheel defines an expanded state in which the plurality of modular segments are expanded so as to define a maximum circumference.

8. The steering wheel of claim 7, wherein the steering wheel defines at least one intermediary state in which the plurality of modular segments are oriented such that the steering wheel has a circumference that is less than the maximum circumference and that is greater than the minimum circumference.

9. The steering wheel of claim 1, wherein each of the modular segments of the plurality of modular segments are individually retractable to reduce the circumference of the steering wheel and expandable to increase the circumference of the steering wheel.

10. The steering wheel of claim 1, wherein the telescoping arms cooperate to retract within the center post to reduce the circumference of the steering wheel and emerge from the center post to increase the circumference of the steering wheel.

11. The steering wheel of claim 1, wherein a modular segment of the plurality of modular segments has a flexible outer body and a collapsible inner body.

12. A method of adjusting the circumference of the steering wheel according to claim 1, wherein the method comprises:
receiving a radial force relative to the center post axis at one or more of the modular segments of the plurality of modular segments, wherein the radial force has a force direction including an inward direction toward the center post axis or an outward direction away from the center post axis; and
adjusting, the arc length of one or more modular segments of the plurality of modular segments corresponding to a direction of the radial force.

13. A steering wheel, comprising
a center post,
a plurality of arc segments having a fixed arc length relative to a center post axis defined by the center post;
a plurality of telescoping arms, each arm of the plurality of telescoping arms having a first end portion affixed to the center post and a second end portion non-removably affixed to an arc segment of the plurality of arc segments; and
a plurality of modular segments having an adjustable arc length relative to the center post axis, wherein the plurality of arc segments and the plurality of modular segments cooperate to define a circumference of the steering wheel that defines a retracted state in which the plurality of modular segments are retracted so as to define a minimum circumference, and wherein the steering wheel defines an expanded state in which the plurality of modular segments are expanded so as to define a maximum circumference.

14. The steering wheel of claim 13, wherein the steering wheel defines at least one intermediary state in which the plurality of modular segments are oriented such that the steering wheel has a circumference that is less than the maximum circumference and that is greater than the minimum circumference.

15. A method of adjusting a circumference of a steering wheel including a plurality of modular segments, a plurality of arc segments, and a plurality of telescoping arms retractably affixed to a center post having a center post axis, wherein the method comprises:
receiving a radial force relative to the center post axis at one or more of the modular segments of the plurality of modular segments, wherein the radial force has a force direction including an inward direction toward the center post axis or an outward direction away from the center post axis, and wherein the plurality of modular segments have an adjustable arc length relative to the center post axis, wherein the plurality of arc segments and the plurality of modular segments cooperate to define a circumference of the steering wheel that is orthogonal to the center post axis, and
cooperatively adjusting the plurality of telescoping arms, each arm of the plurality of telescoping arms having a first end portion affixed to the center post and a second end portion non-removably affixed to an arc segment of the plurality of arc segments that separate a first set of the modular segments of the plurality of modular segments from a second set of the modular segments of the plurality of modular segments.

16. The method of claim 15, wherein the plurality of modular segments includes a first modular segment and a second modular segment that is adjacent to the first modular segment, and wherein the first modular segment is releasably connected to the second modular segment at a tension joint.

* * * * *